Apr. 10, 1923.
S. L. DAVIS ET AL
1,451,536
TIRE TUBE
Filed Nov. 5, 1921
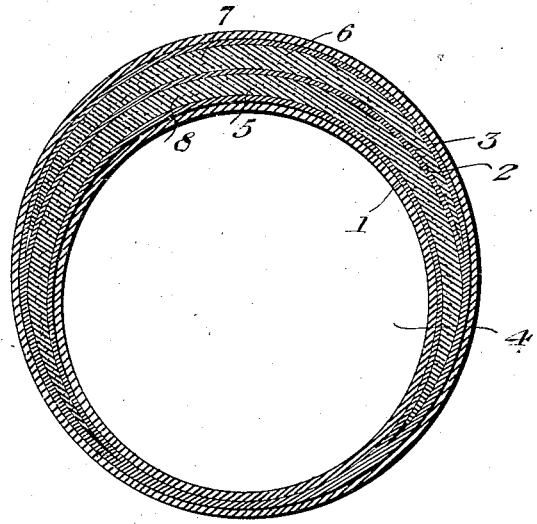
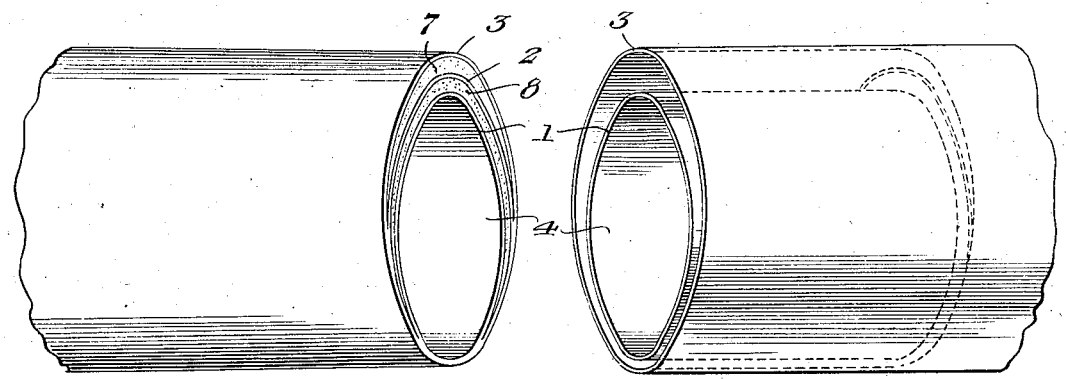
Solomon L. Davis
Earl H. Rinehart
INVENTOR
BY Victor J. Evans
ATTORNEY Patented Apr. 10, 1923.

1,451,536

UNITED STATES PATENT OFFICE.

SOLOMON L. DAVIS AND EARL H. RINEHART, OF EL PASO, TEXAS.

TIRE TUBE.

Application filed November 5, 1921. Serial No. 513,078.

*To all whom it may concern:*

Be it known that we, SOLOMON L. DAVIS and EARL H. RINEHART, citizens of the United States, residing at El Paso, in the county of El Paso and State of Texas, have invented new and useful Improvements in Tire Tubes, of which the following is a specification.

This invention relates to an inner tube for pneumatic tires, the general object of the invention being to provide a tire which will automatically close punctures and one which is so constructed as to reduce the heating thereof to a minimum, thereby increasing the life of the tube.

Another object of the invention is to make the tube of the minimum weight and capable of being easily placed in a casing.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a cross sectional view of a tube constructed in accordance with our invention.

Figures 2 and 3 are fragmentary views showing how the ends of the tubes are connected together.

As shown in these views the tube is constructed of three walls of rubber, indicated at 1, 2 and 3, the outer wall 3 emerging into the wall 2 at the sides of the tire and the wall 2 emerging into the wall 1 at the rim part thereof. These walls form the usual air chamber 4 and the circumferentially extending chambers 5 and 6 upon the sides and tread parts of the tube. The chamber 6 is filled with a composition 7 of raw rubber and asbestos which is cooked to a tough consistency. Chamber 5 is filled with a composition 8 of raw rubber and asbestos which is cooked to a lesser consistency. The composition 7 is tough and pliable and it must not be soft enough to become movable.

When a sharp instrument pierces both walls and enters the air chamber 4, the soft composition 8 will close in behind said instrument as it is withdrawn so as to close the hole made by the instrument, then the tougher composition 7 will check the outward movement of the softer composition. Thus the puncture will be healed between the walls and thereby the escape of air prevented. The tough composition 7 also serves to prevent the air pressure within the tube from forcing out the softer composition and from allowing the air to enter the chamber 6 and cause air pockets or blisters on the tread of the tube.

The joint for the ends of the tube is made by inserting one end within the other, this being permitted by extending the walls 1 and 3 beyond the inner wall 2 and beyond the filling, at one end of the tube so that these walls can overlap the other end of the tube. This other end of the tube is made slightly tapered so that it can be inserted in the space between the walls 1 and 3 such space being clearly shown in Figure 3. This joint will make a double sealed, leak proof, uniform, neat and flexible joint.

Inventors have failed to take into consideration the disastrous effect of the heavy air pressure on the inside of the tube with the result that when a puncture occurs the great air pressure on the inside forces the healing compound in that particular spot clear out of the tube and into the casing thereby robbing the tube of its efficiency. Also, in road service it has been proven that the air will rush into the space between the two walls and cause air pockets or blisters on the tread of the tube. The tough composition between walls 2 and 3 will prevent this blistering and will keep the air in its proper place.

It may readily be appreciated that a tube with walls as heavy as is necessary to carry a healing compound must have a specially designed joint. Tubes of this nature being manufactured at the present time have not taken this phase into consideration with the result that at the joint the inside or air chamber of the tube is fifty per cent smaller in size than the balance of the tube. This causes an exceedingly hard place in the tube with the result there is no stretch in the joint and a heavy air pressure will cause the tube to bulge and in instances where they are subject to heavy loads the tubes have blowed out on the rim side right up against the joint. Our joint is an entire departure from the old methods of making joints as we have designed a dove-tailed joint which will be easy to manufacture, will be thin enough to stretch under pressure, will have two holding edges where it will be cemented, instead of the customary one edge, and will allow the interior of the tube to be practically uniform in size.

Both fillings may be composed of plastic rubber or gum and asbestos and pulverized cork may be substituted for the asbestos.

A tube constructed in accordance with this invention will automatically close punctures, will carry sufficient air pressure to give the tire its proper resiliency and heating of the tube by use will be materially reduced.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

A pneumatic tube of the character described comprising an outer wall, an inner wall and an intermediate wall dividing the space between the outer and inner walls into circumferentially extending chambers, resilient material filling the outer chamber, resilient material of greater consistency than the first mentioned material filling the inner chamber, said walls and material being slightly tapered toward one end, and at the opposite end the outer and inner walls extending substantially beyond the intermediate wall and said resilient materials as and for the purpose specified.

In testimony whereof we affix our signatures.

SOLOMON L. DAVIS.
EARL H. RINEHART.